United States Patent
Gagas et al.

(10) Patent No.: US 11,548,395 B2
(45) Date of Patent: Jan. 10, 2023

(54) ELECTRIC DRIVE STALL TORQUE ENHANCEMENT BASED ON VEHICLE LEVEL INPUTS

(71) Applicant: GM GLOBAL TECHNOLOGY OPERATIONS LLC, Detroit, MI (US)

(72) Inventors: Brent S. Gagas, Pleasant Ridge, MI (US); Brian A. Welchko, Oakland, MI (US); Kerrie M. Spaven, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 186 days.

(21) Appl. No.: 17/154,155

(22) Filed: Jan. 21, 2021

(65) Prior Publication Data
US 2022/0227235 A1     Jul. 21, 2022

(51) Int. Cl.
*B60L 15/20*     (2006.01)
*B60L 15/02*     (2006.01)
*B60L 15/08*     (2006.01)

(52) U.S. Cl.
CPC .............. *B60L 15/20* (2013.01); *B60L 15/025* (2013.01); *B60L 15/08* (2013.01);
(Continued)

(58) Field of Classification Search
CPC ........ B60L 15/20; B60L 15/025; B60L 15/08; B60L 2240/423; B60L 2240/642;
(Continued)

(56) References Cited

U.S. PATENT DOCUMENTS

| | | | |
|---|---|---|---|
| 2009/0120701 A1* | 5/2009 | Taguchi | B60W 10/08 318/434 |
| 2012/0112674 A1* | 5/2012 | Schulz | B60L 50/51 318/400.09 |
| 2022/0212544 A1* | 7/2022 | Keller | B60L 3/102 |

FOREIGN PATENT DOCUMENTS

| | | | | |
|---|---|---|---|---|
| CN | 112187124 A | * | 1/2021 | ............. B60L 15/20 |
| DE | 102016113762 A1 | * | 2/2017 | ............. B60K 1/00 |

(Continued)

OTHER PUBLICATIONS

Goyal et al.; A Comparative Performance of Six-Phase Nine Switch Inverter Operation with SPWM and SVPWM; 2012 IEEE International Conference on Power Electronics, Drives and Energy Systems Dec. 16-19, 2012 (Year: 2012).*
(Continued)

*Primary Examiner* — Michael J Zanelli
(74) *Attorney, Agent, or Firm* — Quinn IP Law

(57) ABSTRACT

A method for increasing a default electric stall torque limits in a motor vehicle having an electrified powertrain inclusive of a traction power inverter module (TPIM) connected to an electric traction motor includes receiving vehicle level inputs via a controller. The controller is programmed with the default electric stall torque limits. The method includes selecting an inverter control strategy, via the controller, as a selected inverter control strategy in response to the vehicle level inputs, the strategy including temporarily increasing the default electric stall torque limits while applying a pulse width modulation (PWM) type at a corresponding PWM switching frequency. The method also includes controlling an output state of the TPIM and the electric traction motor over a calibrated duration, via the controller, using the selected inverter control strategy. A motor vehicle includes the controller, road wheels, TPIM, and traction motor.

20 Claims, 5 Drawing Sheets

(52) U.S. Cl.
CPC ... *B60L 2240/423* (2013.01); *B60L 2240/642* (2013.01); *B60L 2250/26* (2013.01)

(58) Field of Classification Search
CPC ............ B60L 2250/26; B60L 2220/14; B60L 2270/145; B60L 2260/22; Y02T 10/62; Y02T 10/64; Y02T 10/70; Y02T 10/72
See application file for complete search history.

(56) References Cited

FOREIGN PATENT DOCUMENTS

| EP | 1788698 | A1 | * | 5/2007 | .......... B60L 11/1803 |
| JP | 3816300 | B2 | * | 8/2006 | |
| JP | 2014075920 | A | * | 4/2014 | .............. H02P 27/08 |
| KR | 20170013021 | A | * | 2/2017 | .............. B60L 15/20 |
| WO | WO-0231952 | A1 | * | 4/2002 | ........ H02M 7/53875 |

OTHER PUBLICATIONS

Choudhury et al.; A Hybrid-PWM Based DC-Link Voltage Balancing Algorithm fora 3-Level Neutral-Point-Clamped (NPC) DC/AC Traction Inverter Drive; 2015 IEEE Applied Power Electronics Conference and Exposition (APEC), 2015; pp. 1347-1352 (Year: 2015).*

* cited by examiner

ELECTRIC DRIVE STALL TORQUE ENHANCEMENT BASED ON VEHICLE LEVEL INPUTS

INTRODUCTION

The present disclosure relates generally to methods and systems for optimizing low-speed electric drive performance of a battery electric vehicle, a hybrid electric vehicle, or another mobile platform having an electrified powertrain. In particular, the present disclosure pertains to real-time controller-based adjustments to baseline/default electric stall torque limits and associated power inverter control strategies for the purpose of situationally enhancing stall performance for a given set of operating conditions.

As appreciated in the art, an electrified powertrain is "electrified" in the sense of having a high-voltage bus powering operation of one or more rotary electric machines. For example, a motor vehicle having an electrified powertrain uses one or more electric traction motors to generate propulsion torque, with the electric traction motors acting as prime movers. That is, output torque from the election traction motor(s) is directed to one or more drive axles and connected road wheels during different drive modes. Relative torque contribution from the electric traction motor(s) and possibly other prime movers, such as an internal combustion engine, is selected in real-time based by an onboard controller based on a driver-requested torque and a myriad of other vehicle inputs.

An electric traction motor when used as part of an electrified powertrain is frequently configured as polyphase/alternating current (AC) device. A power inverter is therefore disposed between a wound stator of the traction motor and an onboard direct current (DC) voltage supply, with the latter typically embodied as a high-voltage propulsion battery pack, e.g., a multi-cell lithium-ion battery pack. Pulse width modulation (PWM)-based switching state control of individual semiconductor switches arranged within switching dies of the power inverter is used to convert a DC input voltage from the battery pack into a polyphase/AC output voltage. The AC output voltage from the power inverter is directed to the stator, and sequentially energizes the stator's field windings to ultimately impart rotation to a rotor. In order to protect sensitive power electronic hardware of an electrified powertrain, operation of the electric traction motor and its associated power inverter is carefully controlled according to a calibrated set of thermal, torque, speed, and other performance capability limits.

SUMMARY

The present disclosure pertains to real-time operational control of an electrified powertrain aboard a motor vehicle or another mobile platform having at least one electric traction motor connected to and driven by a respective power inverter, the latter of which referred to hereinafter as a traction power inverter module (TPIM). The method described herein situationally increases default electric stall torque limits of the TPIM and selects a corresponding inverter control strategy based on a set of vehicle level inputs. That is, the vehicle level inputs are used by the controller to determine present vehicle conditions and/or driver intentions indicative of an impending operation at or near a stall condition.

As used herein and in the art, electric stall torque refers to an amount of motor output torque available from an electric traction motor when operating at zero output frequency. For a synchronous machine, for instance, electric stall torque is the torque load on the electric motor required to cause a rotor of the electric traction motor to stop spinning. The various controller-based control actions disclosed herein are thus applied anywhere between a zero output speed of the electric traction motor and a calibrated stall torque threshold speed, which is embodied as a particular output frequency.

Based on the vehicle level inputs, such as but not necessarily limited to an incline or decline grade, braking level, acceleration request, selected drive mode, and other possible inputs, the controller intelligently selects a pulse width modulation (PWM) type and an inverter switching frequency. This selection is made during low-speed, high-current operation of the TPIM and traction motor as a tradeoff between a duration of time at temporarily increased electric stall torque limits, on one hand, and noise, vibration, and harshness (NVH) performance on the other hand.

The present solution is intended to enable temporary operation at increased stall torque limits, relative to default levels, without modifying or damaging sensitive underlying powertrain hardware, principally the TPIM and its delicate inverter switches, and without adversely affecting the above-noted NVH performance. Increasing stall torque capability occurs herein by decreasing motor output torque limits toward a calibrated or predetermined "stall torque notch", i.e., default limits that can be run and maintained indefinitely at steady-state without violating inverter thermal limits. This occurs as a function of time during the above-noted low-speed, high-current operation.

According to an exemplary embodiment, a method is disclosed herein for increasing electric stall torque limits in a motor vehicle having an electrified powertrain inclusive of a TPIM and an electric traction motor, with the electric traction motor electrically connected to the TPIM. The method includes receiving a set of vehicle level inputs via a controller, with the controller programmed with default electric stall torque limits. An inverter control strategy is then selected via the controller, as a selected inverter control strategy, which occurs in response to the vehicle level inputs. The selected inverter control strategy, which includes a selected PWM type and a corresponding PWM switching frequency, may also include a temporarily increase in the default electric stall torque limits. The method in this embodiment also includes controlling an output state of the TPIM and the electric traction motor over a calibrated duration, via the controller using the inverter control strategy.

Receiving the set of vehicle level inputs may include, in certain embodiments, receiving a braking request and an acceleration request from a brake pedal sensor and an accelerator pedal sensor, respectively, and/or receiving a grade signal from a grade sensor, with the grade signal being indicative of an incline or decline of the motor vehicle indicative of grade. The vehicle level inputs may include a mode selection signal from a mode selection device, with such a signal being indicative of a selected mode of operation of the motor vehicle.

In different illustrative and non-limiting embodiments, the selected PWM type may include Space Vector PWM (SVPWM) at a PWM switching frequency of 10 kHz, e.g., when the set of vehicle level inputs is indicative of a flat terrain, a threshold traction event, a hill holding maneuver, or a wide open throttle maneuver.

The PWM type may include a Discontinuous PWM (DPWM) type and the PWM switching frequency may be less than 10 kHz, e.g., 2 kHz, when the set of vehicle level inputs is indicative of a terrain mode or a rock crawl maneuver.

Selecting the inverter control strategy may include modifying a preselected inverter control strategy in response to the set of vehicle level inputs.

A motor vehicle is also disclosed herein. In a representative embodiment, the motor vehicle includes a set of road wheels, an electrified powertrain having TPIM and an electric traction motor, and a controller. The electric traction motor is electrically connected to the TPIM and mechanically coupled to the road wheels. The controller is programmed with the default electric drive torque limits for the TPIM and the electric traction motor, and is configured to execute the above-noted method.

A controller is also disclosed herein having a processor and memory on which is recorded the default electric stall torque limits and instructions. Execution of the instructions by the processor causes the controller to receive a set of vehicle level inputs, and to select an inverter control strategy, as a selected inverter control strategy in response to the set of vehicle level inputs. The selected inverter control strategy includes temporarily increasing the default electric stall torque limits, and applying a PWM type at a corresponding PWM switching frequency. Execution of the instructions also causes the controller/processor to control an output state of the TPIM and the electric traction motor over a calibrated duration using the selected inverter control strategy.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

DETAILED DESCRIPTION

Figure 1:
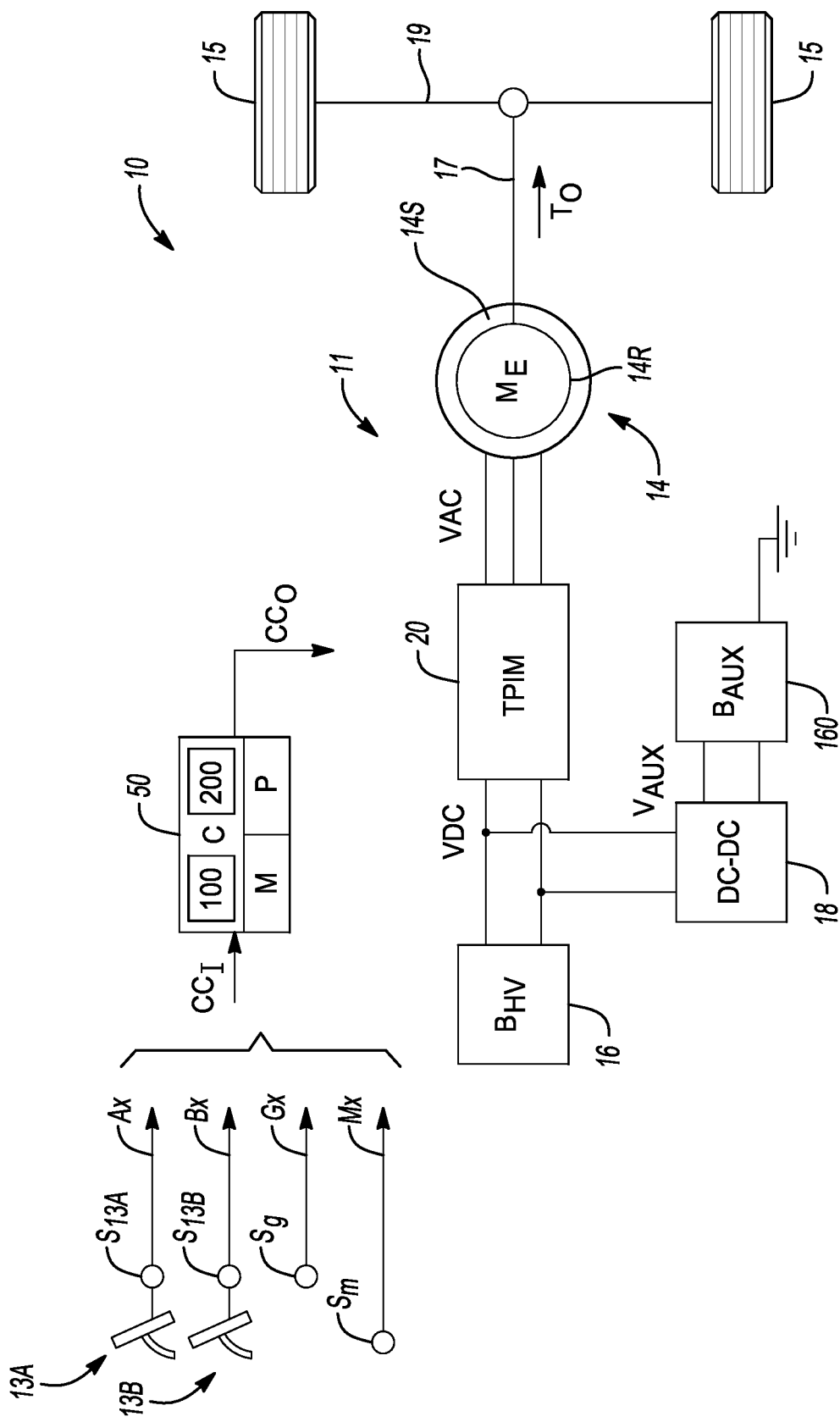
FIG. 1 is a schematic illustration of a representative motor vehicle with an electrified powertrain and a controller programmed to select and execute an appropriate inverter control strategy in accordance with the present disclosure.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Referring to the drawings, wherein like reference numbers refer to like features throughout the several views, an electrified powertrain 11 is depicted schematically in FIG. 1 having a controller (C) 50 programmed with default electric stall torque limits 200. The controller 50 is configured to selectively increase the default stall torque limits 200 in response to a set of vehicle level inputs (arrow CCI). Within the scope of the present disclosure, the controller 50 automatically receives and evaluates the vehicle level inputs (arrow CCI) to ascertain present vehicle conditions and driver intentions that, together or individually, may be indicative of an impending transient or extended operation at or near stall conditions.

The controller 50 is configured to execute a method 100 via execution of computer-readable instructions embodying the present method 100, with an embodiment of the method 100 described below with reference to FIGS. 5 and 6. The method 100 is used to enable the controller 50 to intelligently select a particular pulse width modulation (PWM) type and a PWM switching frequency in response to this determination. As noted above, this selection is made as a tradeoff between an expected duration operating, with the controller 50 temporarily enforcing an increase in the default electric stall torque limits 200 in a manner that optimizes a trade off with resulting noise, vibration, and harshness (NVH) performance.

For illustrative simplicity, select components of the electrified powertrain 11 are shown and described in detail below while other components are omitted. The electrified powertrain 11 may be used aboard a motor vehicle 10 as shown in FIG. 1 or with another mobile platform, e.g., a watercraft, an aircraft, a rail vehicle, etc. In the depicted representative embodiment of FIG. 1, the motor vehicle 10 is configured as a typical road vehicle having road wheels 15 in rolling contact with a road surface. The actual number of road wheels 15 may vary with the application and the configuration of the motor vehicle 10, with as few as one road wheel 15 being possible, for instance in the context of motorcycles, scooters, or e-bikes, and with more than the illustrated number being possible in other configurations.

The electrified powertrain 11 includes at least one electric traction motor ($M_E$) 14, which in the illustrated embodiment is coupled to one or more of the road wheels 15 via an output member 17 and one or more drive axles 19. The electric traction motor 14 is coupled to and powered by a traction power inverter module (TPIM) 20, with operation of the electric traction motor 14 and the TPIM 20 closely governed by the controller 50 according to the default electric stall torque limits 200, with application of the electric stall torque limits 200 and increased variations thereof described in detail below with reference to FIGS. 2A-4.

With continued reference to FIG. 1, the representative electric traction motor 14 is connected to and energized by a direct current (DC) voltage supply, in this instance a rechargeable high-voltage battery pack ($B_{HV}$) 16. This occurs through cooperative operation of the controller 50 and the TPIM 20, with the TPIM 20 being electrically connected to individual phase windings (VAC) of the electric traction motor 14, e.g., using AC cables. Through switching control of the TPIM 20 by the controller 50, or more precisely by operation of a gate driver (not shown) in communication therewith, the TPIM 20 converts a DC voltage from the battery pack 16 to a variable frequency/variable amplitude polyphase/AC voltage to energize the electric traction motor 14 and thereby produce a desired torque (arrow $T_O$). Rotation of a cylindrical rotor 14R of the electric traction motor 14 powers the road wheels 15 in the non-limiting embodiment of FIG. 1. Hybrid embodiments may be envisioned within the scope of the disclosure in which an internal combustion engine (not shown) or another torque source or prime mover works alone or in conjunction with the electric traction motor 14 to generate propulsion torque in a mode-specific manner.

The electric traction motor 14 in the illustrated embodiment is a polyphase/AC rotary electric machine having the cylindrical rotor 14R and a cylindrical stator 14S. In a typical radial flux configuration, the rotor 14R may be coaxially arranged with respect to the stator 14S, such that the stator 14S surrounds the rotor 14R, with axial flux-type machines also being usable within the scope of the present disclosure. The rotor 14R is coupled to a mechanical load, such as one or more of the road wheels 15, via the output member 17. The output member 17, which may be embodied as a rotatable gear set, shaft, or other mechanical mechanism, may be connected to the road wheels 15 via the drive axle(s) 19 and/or an intervening gear box/transmission (not shown), with the output member 17 ultimately transmitting output torque (arrow $T_o$) from the electric traction motor 14 to the road wheels 15 to propel the motor vehicle 10.

Still referring to FIG. 1, other components of the electrified powertrain 11 may also include a DC-to-DC voltage converter 18 and a low-voltage/auxiliary battery ($B_{AUX}$) 160. The high-voltage propulsion battery pack 16 is connected to the TPIM 20 via a high-voltage bus (VDC), with typical voltage levels of such a high-voltage bus being 300V or more, or other voltage levels in excess of auxiliary/12-15V levels of the auxiliary battery 160. However, as the vehicle 10 may also include a myriad of low-voltage systems, a low-voltage bus ($V_{AUX}$) may be powered by the DC-to-DC converter 18, which in turn may be used to maintain a low-voltage charge level of the auxiliary battery 160.

Figure 5:
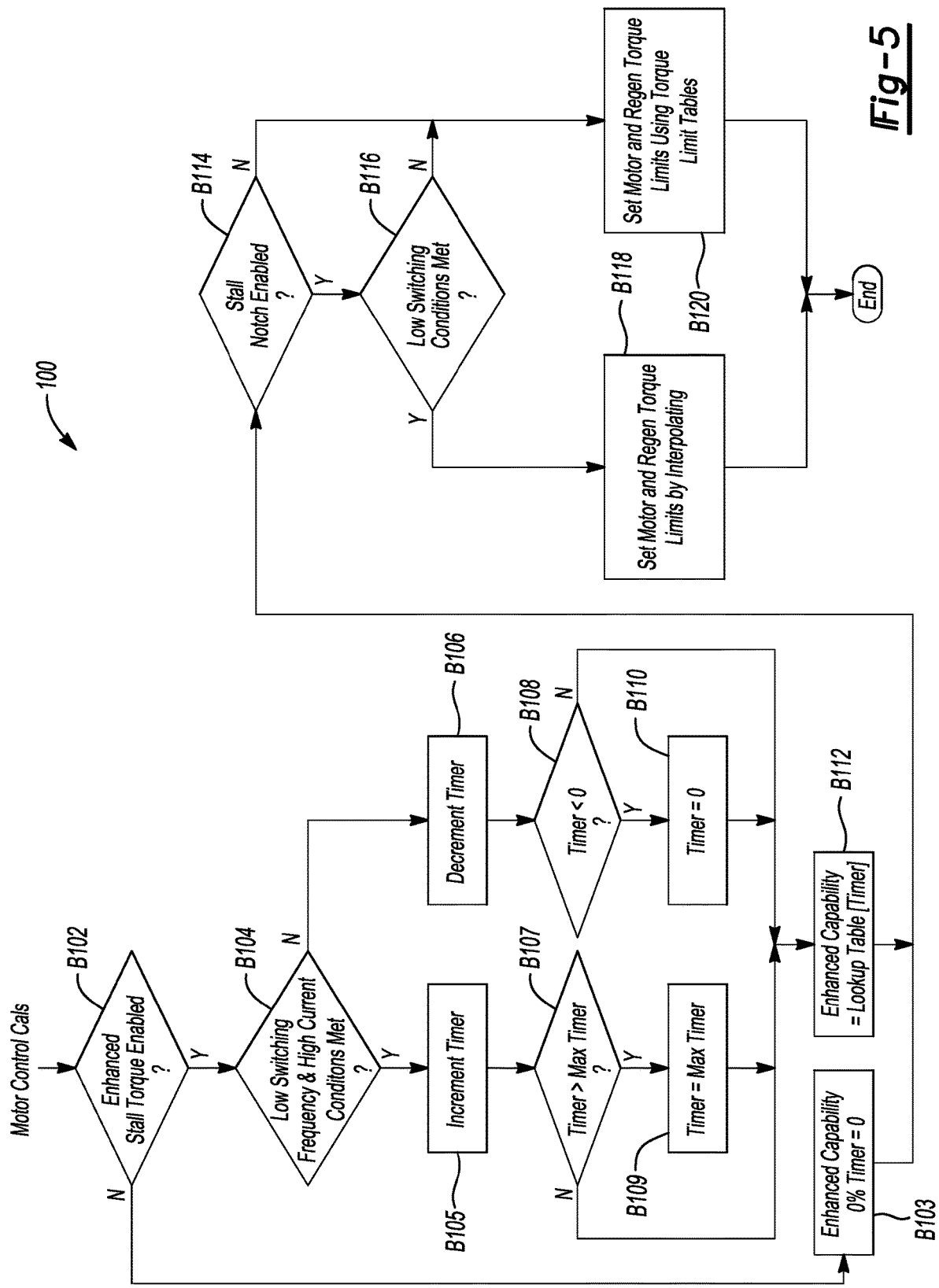
FIGS. 5 and 6 are flow charts describing embodiments of the present method.
Figure 6:
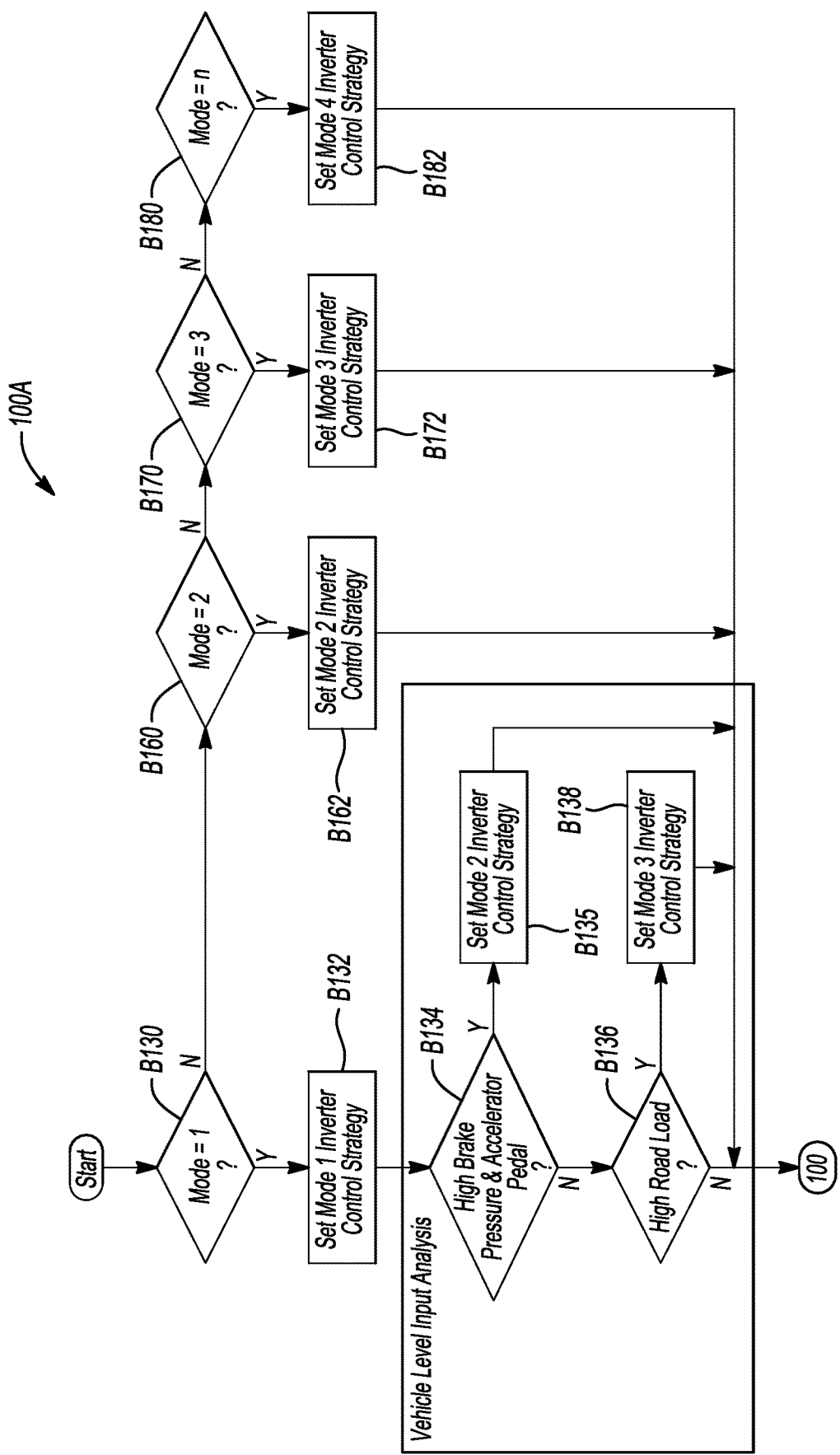

The controller 50 of FIG. 1 may be configured to execute other diagnostic and/or control functions in addition to those that are immediately germane to the present method 100 of FIGS. 5 and 6. For example, the controller 50 may be a hybrid control unit, a transmission control unit, or another suitable standalone or networked vehicle controller for the purposes of the present disclosure. As such, the controller 50 may be embodied as one or more electronic control units or computational nodes responsive to vehicle level inputs signals (arrow $CC_I$) and other possible control signals, both in the course of executing the method 100 as well as when executing other possible control actions.

For the purposes of executing the method 100 in particular, the controller 50 is equipped with application-specific amounts of the volatile and non-volatile memory (M) and one or more of processor(s) (P), e.g., microprocessors or central processing units, as well as other associated hardware and software, for instance a digital clock or timer, input/output circuitry, buffer circuitry, Application Specific Integrated Circuits (ASICs), systems-on-a-chip (SoCs), electronic circuits, and other requisite hardware as needed to provide the programmed functionality. In the context of the present disclosure, the controller 50 executes instructions via the processor(s) (P) to cause the controller 50 to perform the method 100. In so doing, the controller 50 ultimately transmits electronic control signals (arrow $CC_O$) to gate control pins (not shown) of the TPIM 20 for control of the electric traction motor 14 connected thereto. The electronic control signals (arrow $CC_O$) include a commanded PWM switching frequency and PWM type to the TPIM 20, or more precisely, to a gate driver (not shown) connected to the above-noted gate pins of the constituent switches thereof, as appreciated in the art. Thus, execution of the method 100 ultimately includes controlling a switching output state of the TPIM 20 and a dynamic output state of the electric traction motor 14 for a calibrated duration in accordance with a selected inverter control strategy.

In order to optimize an electric drive performance of the motor vehicle 10 during certain operating maneuvers, the controller 50 and the TPIM 20 of FIG. 1 utilize an intelligent control strategy and hardware calibration to selectively increase electric stall torque relative to the level of the default electric stall torque limits 200. To this end, the controller 50 is programmed in software and equipped in hardware, i.e., configured, to execute instructions embodying the method 100 under circumstances when increased stall torque capability is desired.

Figure 2C:
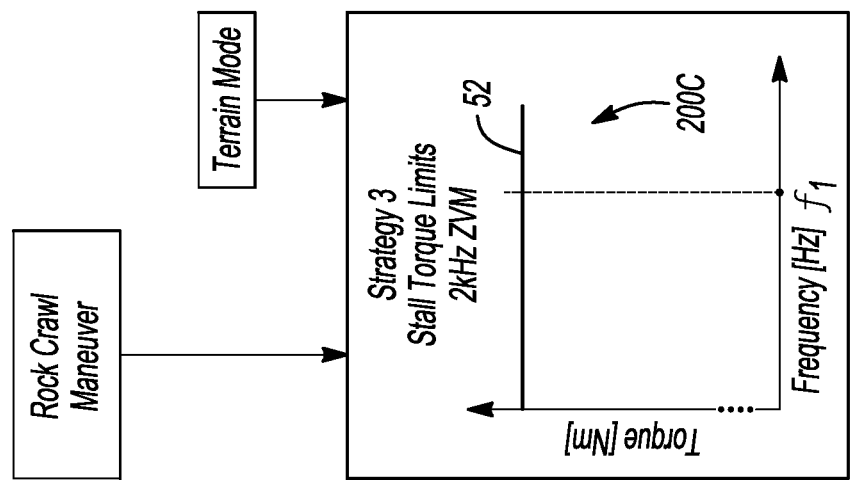
FIGS. 2A-2C are representative frequency plots for different inverter control strategies within the scope of the present disclosure, with AC current frequency in Hertz (Hz) depicted on the horizontal axis, and torque in Newton-meters (Nm) depicted on the vertical axis.
Figure 2B:
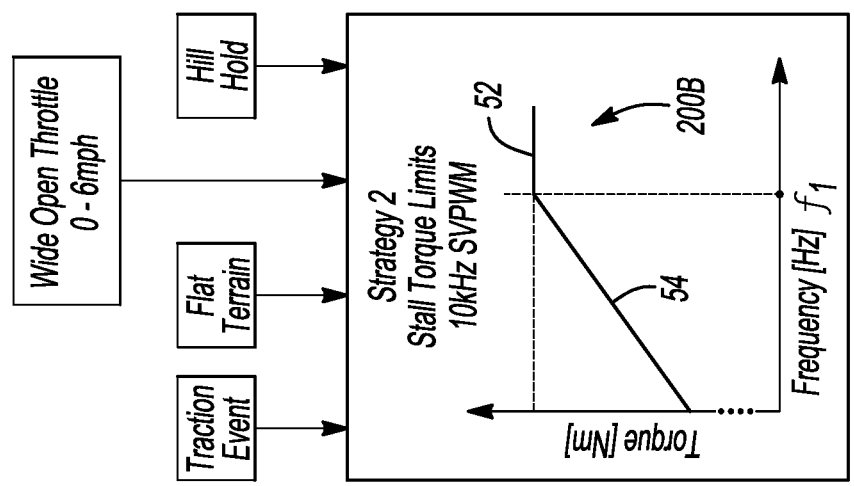
Figure 2A:
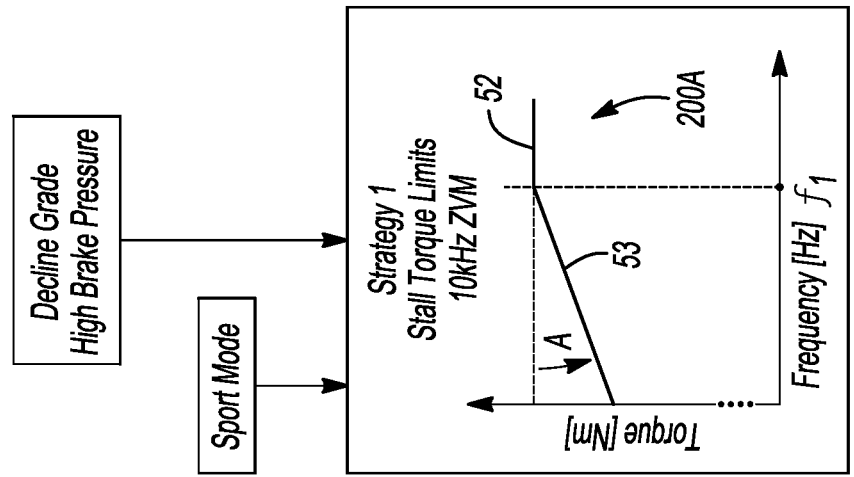

In a broad sense, the memory (M) of the controller 50 may be programmed with multiple different inverter control strategies, nominally Strategies 1, 2, and 3 of FIGS. 2A, 2B, and 2C, respectively, and possibly n additional inverter control strategies, e.g., n=four or more. The controller 50 then processes the various vehicle level inputs (arrow $CC_I$) and, in the process of doing so, selects a mode-suitable one of the inverter control strategies. Each inverter control strategy corresponds to enforcement of a particular adjusted variant of the electric stall torque limits 200.

To that end, the vehicle level inputs (arrow $CC_I$) that are collectively evaluated as part of the present method 100 may include a variety of measured, estimated, or calculated values indicative of vehicle conditions and driver intentions. By way of illustration and not limitation, exemplary vehicle level inputs (arrow $CC_I$) include a grade signal (arrow $G_X$) indicative of the grade of a surface on which the motor vehicle 10 moves or rests, i.e., an angle of inclination of the motor vehicle 10. For instance, a grade sensor $S_g$ connected to the motor vehicle 10 may be used to measure the grade/angle of inclination and report the measured grade as the grade signal (arrow $G_X$).

Similarly, a braking request signal (arrow $B_X$) indicative of an amount of brake pressure applied by a driver of the motor vehicle 10 to a brake pedal 13B, or resulting travel thereof, may be measured by an associated brake pedal sensor $S_{13B}$. Acceleration request signals (arrow Ax) indicative of an amount of pressure and/or travel applied by the driver to an accelerator pedal 13A, measured by an accelerator pedal sensor $S_{13A}$, may likewise be used as part of the vehicle level inputs (arrow $CC_I$). Other possible vehicle level inputs (arrow $CC_I$) such as a driver-selected or autonomously-selected vehicle mode, e.g., touring, sport, rock crawl, hill hold, terrain, etc., or other inputs indicative of the requested mode of the motor vehicle 10 may be communicated to the controller 50 via a mode selection signal (arrow $M_X$), possibly as measured by a mode selection device Sm. Likewise, the vehicle level inputs (arrow $CC_I$) could include other braking torques outside of those measured by the brake pedal sensor $S_{13B}$, e.g., a propulsion system brake torque or a brake pressure request either for the propulsion system of the motor vehicle 10 as a whole or at the individual road wheels 15, which may be determined autonomously in some embodiments, and thus the vehicle level inputs (arrow $CC_I$) may vary with the intended application.

Referring now to FIGS. 2A-2C, three possible inverter control strategies, nominally Strategy 1, Strategy 2, and Strategy 3, respectively, are shown with corresponding electric stall torque limits 200A, 200B, and 200C. Torque limits in Newton-meters (Nm) are depicted on the vertical axis, while AC current frequency (i.e., motor speed for a synchronous machine) of the electric traction motor 14 in hertz (Hz) is depicted on the horizontal axis. The inverter control strategies are selected by the controller 50 in response to different values or combinations of values of the vehicle level inputs (arrow $CC_I$ of FIG. 1). In Strategy 1 of FIG. 2A, for instance, the vehicle level inputs (arrow $CC_I$) may indicate high brake pressure, a particular incline or decline grade, selection of a "sport mode", etc., and thus may be indicative of a threshold low road load.

Relative to the default electric stall torque limits 200 of FIG. 1, which may be approximated by the electric stall torque limits 200B of FIG. 2B, Strategy 1 and operation under low road loads mode may result in enforcement of a relatively high stall torque limit (trace 53), with the stall torque limits gradually increasing from a minimum at zero frequency, i.e., zero speed of the electric traction motor 14, up to a maximum level at a calibrated stall torque AC current frequency threshold $f_1$, with arrow A being indicative of the possible difference of the stall torque limit (trace 53) relative to a calibrated maximum or 100% value (trace 52). The controller 50, in addition to adjusting the stall torque limit 200A as shown, also selects a suitable PWM technique, in this exemplary instance possibly selecting a Discontinuous PWM (DPWM) type, such as but not limited to Zero Vector Modulation (ZVM), at a typical PWM switching frequency of 10 kHz. As understood in the art, ZVM has fewer switching events than SVPWM, for instance, which provides more thermal margin, and therefore allows a relatively higher steady-state torque at stall.

In the exemplary inverter control strategy 200B of FIG. 2B, the vehicle level inputs (arrow $CC_I$) may be indicative of operating in another vehicle mode or under different driving conditions, e.g., a threshold traction event, flat terrain, a wide open throttle maneuver using brake and accelerator pedal simultaneously or launch control to aggressively launch the vehicle maneuver, or "hill hold" maneuver in which the motor vehicle 10 remains stationary on an inclined surface, all of which are indicative of a higher road load. Relative to a level of electric stall torque (trace 52) in FIG. 2A, operation according to inverter control Strategy 2 of FIG. 2B could result in enforcement of a different stall torque limit (trace 54) at lower speeds of the electric traction motor 14, which likewise increases from a minimum at zero speed/zero frequency up to the maximum level of trace 52 at the calibrated stall torque AC current frequency threshold $f_1$. As with FIG. 2A, the controller 50 under the scenario of FIG. 2B also selects a suitable PWM type or technique, which in FIG. 2B includes using the same PWM switching frequency of 10 kHz as is used in FIG. 2A, but with SVPWM instead of ZVM as the selected PWM type for better NVH performance. Other techniques and/or frequencies could be used in other embodiments depending on the NVH tradeoff, as noted above.

FIG. 2C illustrates still another scenario, nominally inverter control Strategy 3, in which the maximum stall torque (trace 52), i.e., 100% stall torque, is enforced at low speeds of the electric traction motor 14. Relative to FIGS. 2A and 2B, which both have a time-limited duration of operating above the stall torque notch, FIG. 2C has no stall torque notch, i.e., Strategy 3 could operate indefinitely at 100% stall torque. As appreciated in the art, some motor vehicles 10, particularly those that are trail rated or configured for off road use, are equipped with selectable "rock crawl" modes or "terrain" modes to enable maximum torque at very low speeds. In accordance with the disclosed strategy, the controller 50 may select a different PWM strategy for operation of the TPIM 20 under such conditions, e.g., ZVM at a lower switching frequency relative to Strategy 1 and Strategy 2, i.e., less than 10 kHz, with a representative PWM switching frequency being about 2 kHz in a possible embodiment. While the particular vehicle level inputs (arrow $CC_I$) and selected PWM types and switching frequencies in FIGS. 2A, 2B, and 2C are non-limiting and illustrative of the present teachings, the noted Figures collectively show the ability of the controller 50 of FIG. 1 to intelligently select a mode-appropriate inverter control strategy in a manner that is closely informed by dynamically changing vehicle level inputs (arrow $CC_I$).

Figure 3:
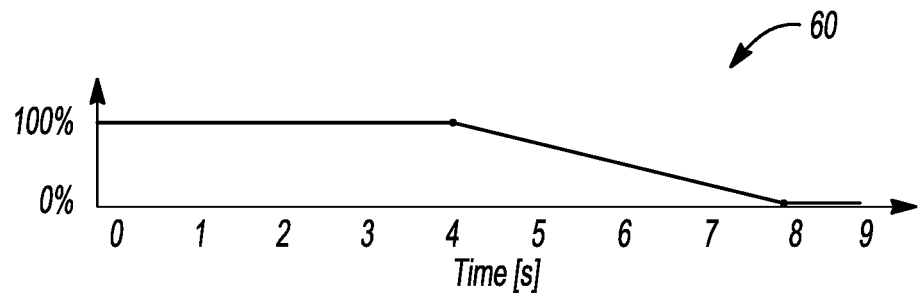
FIG. 3 is a schematic illustration of a representative timer trace for use as part of the present method, with time in seconds (s) depicted on the horizontal axis and a percentage-of-maximum stall torque increase (%) depicted on the vertical axis.

With respect to the applied electric stall torque limits 200A, 200B, and 200C and the selection of different PWM types and PWM switching frequencies, the example Strategies of FIGS. 2A-C may produce perceptibly different NVH effects. For instance, NVH performance under Strategy 1 of FIG. 2A and its slower rate of torque reduction is expected to be reduced relative to Strategy 2. Relative to FIG. 2A, for example, inverter control Strategy 2 of FIG. 2B with its faster torque reduction rate should have an optimal NVH performances. In a relative sense, NVH performance is at its worst when operating under the FIG. 2C scenario, i.e., inverter Strategy 3, with 100% torque limits of trace 52 applied at all times, i.e., from zero speed up to the speed associated with the calibrated stall torque AC current frequency threshold Referring briefly to FIGS. 3 and 4, the controller 50 of FIG. 1 may use an extended stall torque timer, a representative timer trace 60 for which is depicted in FIG. 3 with time in seconds (s) on the horizontal axis and electric stall torque reduction (motor torque increase) depicted on the vertical axis. That is, the controller 50 could utilize increased stall torque capability as a function of time by decreasing electric stall torque limits toward default/baseline stall torque limits 200, e.g., the stall torque limits 200B of FIG. 2B. That is, the controller 50 may limit the time of access to extended capability when operating below the stall torque AC current frequency.

At a given operating point, for instance, the controller 50 could initiate a digital timer, as part of the programmed logic of the controller 50, to limit the amount of time the controller 50 spends at 100% extended stall torque range when below the stall torque AC current frequency $f_1$, thus protecting the TPIM 20 and other sensitive components from overheating. For instance, the exemplary timer trace 60 of FIG. 3 would enable electric stall torque to remain at a mode-specific maximum temporarily, e.g., for 4 s as shown, before ramping down to a calibrated minimum (trace 52) over a predetermined duration, such as from 4 s to 8 s in the illustrated embodiment. After the indicated time has elapsed, in this instance 8 s, the controller 50 may control the TPIM 20 using its existing steady-state torque limits, which corresponds to the minimum stall torque capability, i.e., 0% extended capability.

Figure 4:
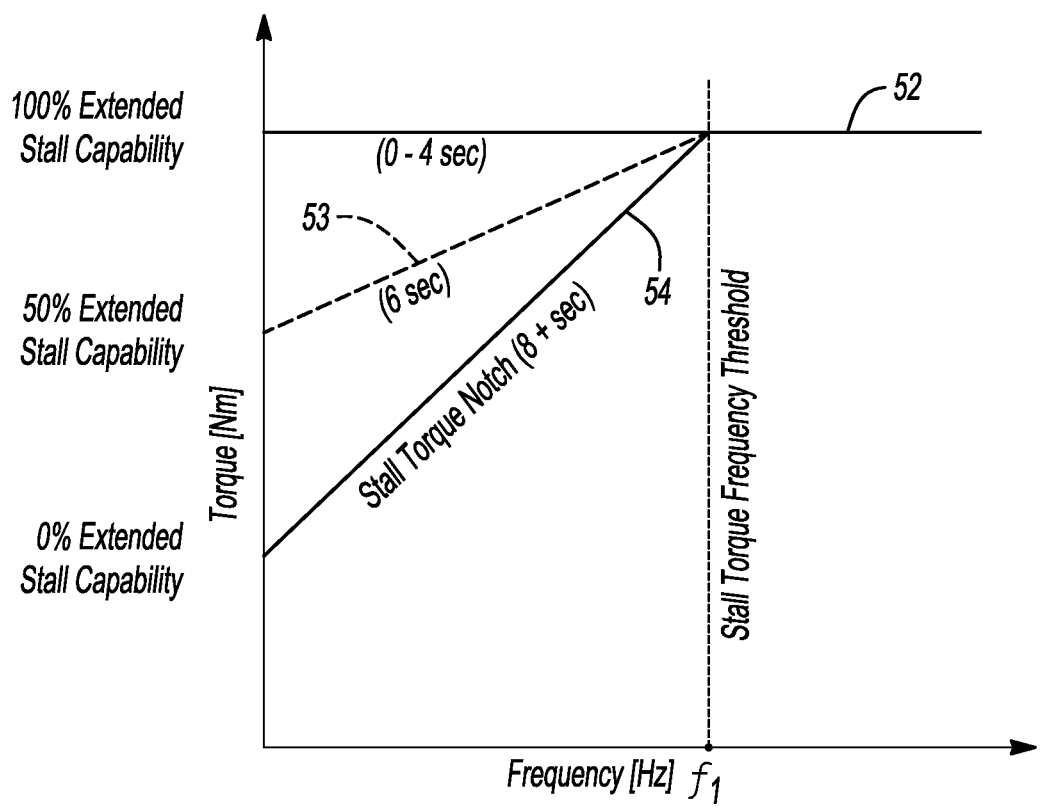
FIG. 4 is another representative frequency plot for the three different inverter control strategies of FIGS. 2A-2C, with AC current frequency in hertz (Hz) depicted on the horizontal axis, and torque in Newton-meters (Nm) depicted on the vertical axis.

FIG. 4 thus illustrates a possible control scenario in which the controller 50 could enable 100% extended capability from 0-4 s, before dropping to 50% extended capability between 4 s and 6 s, and thereafter dropping to the steady-state stall torque notch from 6-8 s. Thus, FIG. 4 shows extended stall torque capability being controlled via the controller 50 based on a timer so as to protect the TPIM 20 and other sensitive hardware from heating up to thermal limits. Such a timer may be calibrated differently for the different inverter control modes, with those having the best relative NVH performance and highest thermal stresses being allowed to continue for shorter durations relative to steady-state operation. In that respect, the indicated durations 4 s, 6 s, and 8 s are merely illustrative of the present teachings and not limiting thereof.

Referring to FIG. 5, the method 100 is configured or programmed for increasing the baseline electric stall torque limits 200 in the motor vehicle 10 shown in FIG. 1, with the motor vehicle 10 being representative of a mobile platform having the electrified powertrain 11 inclusive of the TPIM 20, with the TPIM 20 electrically connected to the electric traction motor 14. In a general sense, the method 100 includes receiving the set of vehicle level inputs (arrow $CC_I$)via the controller 50, with the controller 50 programmed with the default electric stall torque limits 200. The method 100 in this embodiment includes selecting an inverter control strategy, via the controller 50, as a selected inverter control strategy, with the controller 50 doing this in response to the set of vehicle level inputs (arrow $CC_I$).

The selected inverter control strategy includes temporarily increasing the default electric stall torque limits 200, as well as selecting and applying a PWM type at a corresponding PWM switching frequency. The method 100 thereafter includes controlling an output state of the TPIM 20 and the electric traction motor 14 over a calibrated duration, via the controller 50, using the selected inverter control strategy. Controlling the output state, as understood in the art, may include controlling an ON/OFF conducting state of resident switches of the TPIM 20 to thereby adjust the output voltage and current of the TPIM 20, which in turn changes or maintains a torque or speed of the electric traction motor 14.

An exemplary embodiment of the method 100 commences with block B102 with receipt or determination of present motor control calibrations by the controller 50. Based on inverter mode requests, which may be autonomously requested or selected by the driver, such motor control calibrations include PWM type, switching frequency, stall torque notch, timer limits, enable/disable calibrations, etc. The controller 50 uses the motor control calibrations to determine whether enhanced stall torque capabilities should be temporarily enabled, i.e., whether motor output torque limits ought to be temporarily increased relative to those of the default electric stall torque limits 200 under low-speed, high-current conditions. The method 100 proceeds to block B104 when the controller 50 determines that enhanced stall torque capabilities should be enacted, and to block B103 in the alternative.

At block B103, the controller 50 may set the above-described extended stall torque capability timer to 0 and the extended torque capability to 0% before proceeding to block B114.

Block B104 includes determining, using the motor control calibrations from block B102, whether lower motor input frequency (below the stall torque AC current frequency threshold $f_1$) and higher current conditions have been met. That is, the controller 50 of FIG. 1 determines from the motor control calibrations whether reduction in switching frequency and high current flow through the switches of the TPIM 20 is likely to be needed at low speeds of the electric traction motor 14 for optimal drive and NVH performance. The method 100 proceeds to block B105 when this is the case, and to block B106 in the alternative.

Block B105 includes incrementing the enhanced stall torque capability timer before proceeding to block B107.

Block B106, which is arrived at upon a determination at block B104 that low AC current frequency and/or high current conditions have not been met, includes decrementing the enhanced stall torque capability timer. The method 100 then proceeds to block B108.

At block B107, the controller 50 compares the timer value to a calibrated maximum value, and then proceeds to block B109 when the timer value exceeds the calibrated maximum value. In the alternative, the method 100 proceeds to block B112.

At block B108, the controller 50 determines whether, upon decrementing the timer at block B106, the timer value is now less than zero. If so, the method 100 proceeds to block B110. The method 100 proceeds instead to block B112 in the alternative when the timer value equals or exceeds zero.

Block B109 includes setting the present timer value to the maximum timer value before proceeding to block B112.

Block B110 includes setting the timer value to zero before proceeding to block B112.

At block B112, the controller 50 next accesses a lookup table in memory (M) of FIG. 1 and selects an appropriate timer value for use with the enhanced stall torque capability. The lookup table determines the percentage of extended torque capability as a function of time, as noted above. That is, the timer value is input, and the corresponding enhanced stall torque capability is selected. The controller 50 then proceeds to block B114.

At block B114, the controller 50 next ascertains whether the baseline stall torque limits 200 and the resulting stall torque notch are currently enabled. As shown via the low-speed pattern of the stall torque limits 200B of FIG. 2B, such a stall torque notch corresponds to torque limits that could be run at steady-state without unduly heating up the TPIM 20. If enabled, the method 100 proceeds to block B116. The method 100 otherwise proceeds to block B120.

Block B116 entails determining, via the controller 50, whether low AC current frequency conditions are present, once again doing so using the motor control calibrations. The method 100 then proceeds to block B118 when such conditions are present, and to block B120 when such conditions are not met.

Block B118 is arrived at upon a determination at block B116 that low AC current frequency conditions are present, includes setting motor and regenerative torque limits of the electric traction motor 14 and the TPIM 20 of FIG. 1 via linear interpolation. Interpolation is between the stall torque limit (trace 54 in FIG. 4) and the 100% extended stall torque capability line (trace 52 of FIG. 4), based on the stall torque percentage calculated from B112 in FIG. 5. The method 100 is then complete once the inverter limits are set, resuming anew with block B102.

Block B120 includes setting motor and regenerative torque limits of the electric traction motor 14 and TPIM 20 of FIG. 1 torque limit tables. The method 100 is then complete once the inverter limits are set, resuming anew with block B102.

Referring now to FIG. 6, method 100 may be practiced using a modified approach using method 100A, with method 100A feeding into method 100 of FIG. 5 as shown. Those skilled in the art will appreciate that a driver or operator of the motor vehicle 10 shown in FIG. 1 could override default inverter control settings and/or select a particular inverter strategy or mode, e.g., using a knob, dial, or touch input. Solely for illustration, FIG. 6 depicts Modes 1, 2, 3, and n, with n being one or more additional Modes. Modes 1-3 may thus correspond to inverter control Strategies 1-3 of FIGS. 2A-C.

Starting with block B130, the controller 50 determines if a selected mode corresponds to Mode 1, e.g., Strategy 1 of FIG. 2A. If not, block B160, B170, and B180 are similarly evaluated for selection of Modes/Strategies 2, 3, . . . , n, with Modes 2 and 3 corresponding to FIGS. 2B and 2C, and mode n being another one or more Modes or Strategies. That is, the three options shown in FIGS. 2A-C are non-limiting and simplified, and thus different inverter strategies may be used for different applications. With respect to operator selection of Modes 2, 3, or n, the controller 50 executes blocks B162, B172, and B182, respectively, by controlling the TPIM 20 of FIG. 1 according to the corresponding strategy.

When block B130 confirms that Mode 1 has been selected, which in FIG. 2A is a low road load/"normal" driving mode, the controller 50 proceeds to block B132 and sets the Mode 1 inverter control strategy described above. The method 100 then proceeds to block B134.

At block B134, the controller 50 could use the vehicle level inputs (arrow $CC_I$ of FIG. 1) to determine whether Mode 1 should be sustained, or if the controller 50 should instead execute another available Mode, e.g., Modes 2 or 3. For example, the controller 50 could determine whether high brake and accelerator pedal pressure are present, in which case the method 100A proceeds to block B135. If the controller 50 detects low brake pressure and accelerator pressure, the method 100A could instead proceed to block B136.

At block B135, in response to a determination at block B134 that high brake and accelerator pedal pressure are present, the controller 50 could transition to Mode 2, described above with reference to FIG. 2B. The method 100A then proceeds with the method 100 as described above with respect to FIG. 5.

Block B136 may entail using the vehicle level inputs (arrow $CC_I$ of FIG. 1), which may be extended beyond those vehicle levels inputs described herein, to determine whether a high road load is present. Such a load may be present, as described above with reference to FIG. 2C, during a rock crawl maneuver, or operation in a terrain mode. As noted above, the latter may be a mode enabled in some motor vehicles 10 for use in low-speed off road driving in a manner replicating four-wheel drive control feel when operating in low range. When the motor vehicle 10 is equipped with such a mode, the controller 50 may proceed to block B138 where the controller 50 sets the Mode 3 inverter control strategy. As with block B135, the controller 50 thereafter proceeds to method 100 of FIG. 5.

As will be appreciated by those skilled in the art in view of the foregoing disclosure, the present teachings enable the controller 50, autonomously and/or with input from a driver of the motor vehicle 10 shown in FIG. 1, to increase stall torque capability by decreasing torque limits toward the stall torque notch of FIG. 2. This occurs as function of time within defined low-speed/high-current situations, while avoiding reaching thermal limits. Different control scenarios are possible, e.g., eliminating the stall torque notch completely as in FIG. 2C if stall conditions are passed through quickly, or if the PWM type and switching frequency can operate at steady-state at maximum torque without reaching thermal limits, or simply reducing torque limits to match the stall torque notch (FIG. 2B) if vehicle level conditions (arrow $CC_I$) indicate that the motor vehicle 10 may operate at stall for an extended period of time.

Scenarios such as FIG. 2A may be enacted to increase stall torque limits relative to the stall torque notch. As explained above, the duration for maintaining increased stall torque and a corresponding NVH performance is a tradeoff based on PWM type and switching frequency selection. For instance, low-frequency switching of about 2 kHz may be used with ZVM to enjoy increased stall torque for an extended duration, albeit at the expense of NVH effects. The same 2 kHz switching frequency with SVPWM, or ZVM at a higher switching frequency of 10 kHz, may be used to strike a balance between duration and NVH performance. The higher switching frequency of 10 kHz with SVPWM, for its part, may be used for reduced periods of increased stall torque, with optimal NVH performance.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for increasing electric stall torque limits in a motor vehicle having an electrified powertrain inclusive of a traction power inverter module (TPIM) connected to an electric traction motor, the method comprising:
   receiving a set of vehicle level inputs via a controller, wherein the controller is programmed with default electric stall torque limits;
   selecting an inverter control strategy, via the controller, as a selected inverter control strategy in response to the set of vehicle level inputs, the selected inverter control strategy including temporarily increasing the default electric stall torque limits, and selecting and applying a pulse width modulation (PWM) type at a corresponding PWM switching frequency; and
   controlling an output state of the TPIM and the electric traction motor over a calibrated duration, via the controller, using the selected inverter control strategy.

2. The method of claim 1, wherein receiving the set of vehicle level inputs includes receiving a braking request and an acceleration request from a brake pedal sensor and an accelerator pedal sensor, respectively.

3. The method of claim 1, wherein receiving the set of vehicle level inputs includes receiving a grade signal from a grade sensor, the grade signal being indicative of an angle of inclination of the motor vehicle.

4. The method of claim 1, wherein receiving the set of vehicle level inputs includes receiving a mode selection signal from a mode selection device, the mode selection signal being indicative of a selected mode of operation of the motor vehicle.

5. The method of claim 1, wherein the PWM type includes Space Vector PWM (SVPWM) and the PWM switching frequency is 10 kHz when the set of vehicle level inputs is indicative of a threshold road load.

6. The method of claim 1, wherein the PWM type is a Zero Vector Modulation (ZFM) and the PWM switching frequency is less than 10 kHz when the set of vehicle level inputs is indicative of a terrain mode or a rock crawl maneuver.

7. The method of claim 1, wherein receiving the set of vehicle level inputs receiving a preselected inverter control strategy via the controller, and wherein selecting the inverter control strategy includes modifying the preselected inverter control strategy in response to the set of vehicle level inputs.

8. A motor vehicle comprising:
a set of road wheels;
an electrified powertrain having a traction power inverter module (TPIM) and an electric traction motor, wherein the electric traction motor is electrically connected to the TPIM and mechanically coupled to the set of road wheels; and
a controller programmed with default electric stall torque limits for the TPIM and the electric traction motor, wherein the controller is configured to:
receive a set of vehicle level inputs;
select an inverter control strategy as a selected inverter control strategy in response to the set of vehicle level inputs, the selected inverter control strategy including a temporary increase of the default electric stall torque limits, a pulse width modulation (PWM) type, and a corresponding PWM switching frequency; and
control an output state of the TPIM and the electric traction motor over a calibrated duration using the selected inverter control strategy.

9. The motor vehicle of claim 8, further comprising a brake pedal having a brake pedal sensor, the set of vehicle level inputs including a braking request signal from the brake pedal sensor.

10. The motor vehicle of claim 8, further comprising an accelerator pedal having an accelerator pedal sensor, the set of vehicle level inputs further including an acceleration request signal from the accelerator pedal sensor.

11. The motor vehicle of claim 8, further comprising a grade sensor, wherein the set of vehicle level inputs further includes a grade signal from the grade sensor indicative of an angle of inclination of the motor vehicle.

12. The motor vehicle of claim 8, further comprising a mode selection device, wherein the set of vehicle level inputs includes a mode selection signal from the mode selection device indicative of a selected mode of operation of the motor vehicle.

13. The motor vehicle of claim 8, wherein the PWM type is Space Vector PWM (SVPWM) and the PWM switching frequency is 10 kHz when the set of vehicle level inputs is indicative of flat terrain, a threshold traction event, a hill hold maneuver, or a wide open throttle maneuver.

14. The motor vehicle of claim 8, wherein the PWM type is Zero Vector Modulation (ZVM) when the set of vehicle level inputs is indicative of a terrain mode, a rock crawl maneuver, a decline or incline grade, a threshold high braking level, or a sport mode.

15. The motor vehicle of claim 14, wherein the PWM switching frequency is about 2 kHz when the set of vehicle level inputs is indicative of the terrain mode or the rock crawl maneuver, and about 10 kHz when the set of vehicle level inputs is indicative of the incline or decline grade, the threshold high braking level, or the sport mode.

16. The motor vehicle of claim 8, wherein the controller includes a stall torque timer, and wherein the controller is configured to limit the temporary increase of the default electric stall torque limits in accordance with the stall torque timer.

17. A controller having a processor and memory on which is recorded default electric stall torque limits and instructions, wherein an execution of the instructions by the processor is configured to cause the controller to:
receive a set of vehicle level inputs for a motor vehicle, the motor vehicle having a traction power inverter module (TPIM) connected to an electric traction motor;
select an inverter control strategy, as a selected inverter control strategy in response to the set of vehicle level inputs, wherein the selected inverter control strategy includes temporarily increasing the default electric stall torque limits, and temporarily applying a pulse width modulation (PWM) type at a corresponding PWM switching frequency; and
control an output state of the TPIM and the electric traction motor over a calibrated duration using the selected inverter control strategy.

18. The controller of claim 17, wherein the set of vehicle level inputs includes a braking request and an acceleration request from a brake pedal sensor and an accelerator pedal sensor, respectively, a grade signal from a grade sensor, the grade signal being indicative of an angle of inclination of the motor vehicle, and a mode selection signal from a mode selection device, the mode selection signal being indicative of a selected mode of operation of the motor vehicle.

19. The controller of claim 17, wherein the execution of the instructions by the processor is configured to cause the controller to select the PWM type of the inverter control strategy from the group consisting of: Space Vector PWM (SVPWM) and Zero Vector Modulation (ZVM).

20. The controller of claim 17, wherein the set of vehicle level inputs includes a preselected inverter control strategy, and wherein execution of the instructions causes the processor to modify the preselected inverter control strategy in response to the set of vehicle level inputs.

* * * * *